Aug. 27, 1963 W. R. FRANK 3,101,792
OFFSET DISK HARROW
Original Filed March 2, 1959 5 Sheets-Sheet 1

FIG. I

*INVENTOR.*
WILLIAM R. FRANK
BY
ATTORNEYS

Aug. 27, 1963

W. R. FRANK 3,101,792

OFFSET DISK HARROW

Original Filed March 2, 1959

*INVENTOR.*
WILLIAM R. FRANK

BY C. Parker & R.C. Johnson

ATTORNEYS

Aug. 27, 1963  W. R. FRANK  3,101,792
OFFSET DISK HARROW

Original Filed March 2, 1959  5 Sheets-Sheet 4

FIG. 2-A

INVENTOR.
WILLIAM R. FRANK
BY
ATTORNEYS

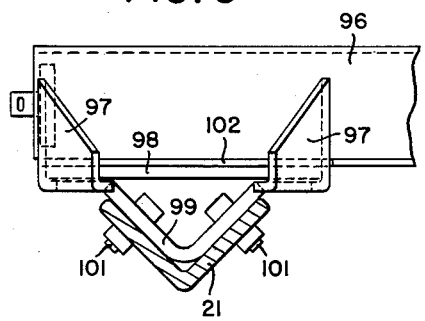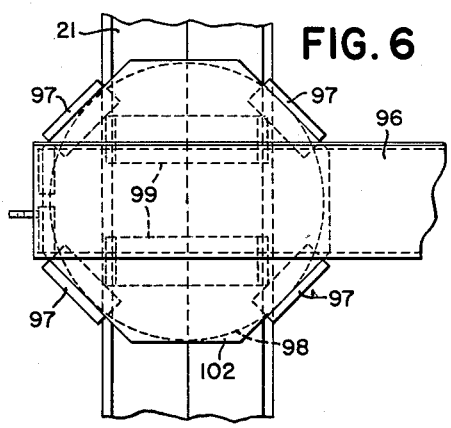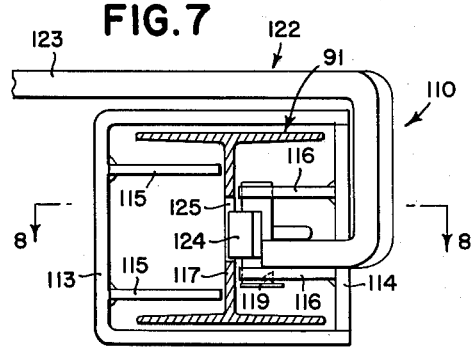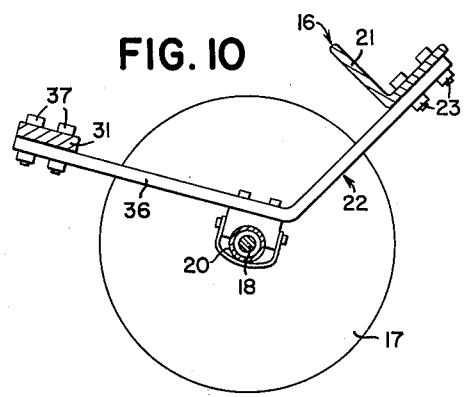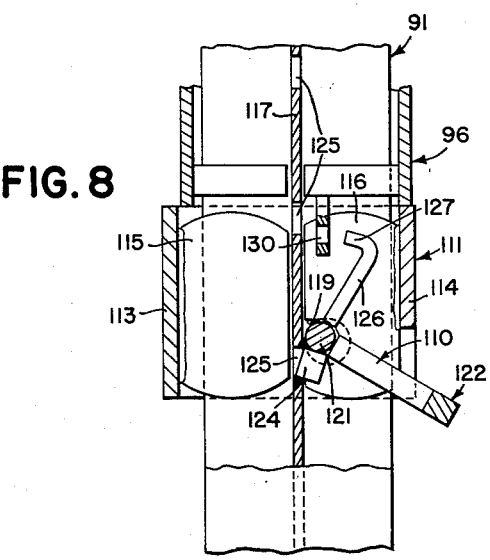

United States Patent Office 3,101,792
Patented Aug. 27, 1963

3,101,792
OFFSET DISK HARROW
William R. Frank, Bell, Calif., assignor to Deere & Company, Moline, Ill., a corporation of Delaware
Continuation of application Ser. No. 796,363, Mar. 2, 1959. This application Feb. 16, 1962, Ser. No. 176,847
9 Claims. (Cl. 172—596)

The present invention relates generally to agricultural implements and more particularly to such tillage implements as disk harrows and the like.

This application is a continuation of my co-pending application Ser. No. 796,363, filed March 2, 1959, now abandoned.

The object and general nature of this invention is a provision of the flexible offset disk harrow of relatively large capacity and especially constructed and arranged to provide for deep tillage with substantially uniform penetration over the entire width of the harrow, even when operating on uneven terrain.

More specifically, it is a feature of this invention to provide a disk harrow having a pair of hingedly connected front gangs and a pair of hingedly connected rear gangs, the hinged connection between the gangs of each pair being so constructed and arranged that the gangs swing relative to each other about an axis that extends forwardly and upwardly relative to the horizontal. By virtue of this construction, the gangs are interconnected in a self-equalizing manner whereby if, for example, the adjacent or inner ends of the gangs tend to penetrate too deep, the inner ends swinging forwardly and the laterally outer ends of the two gangs swinging upwardly and rearwardly, by virtue of the above mentioned angled axis of interconnection the increased soil pressure on the inner ends and the reduced soil pressure on the outer ends will automatically bring the gangs back to a level position. In other words, the result of this particular interconnection is that, under the conditions just assumed, where the inner ends of the gang tend to go too deep, the draft forces on the inner ends of the gangs are increased relative to the draft forces on the laterally outer ends of the gangs, which latter draft forces tend to decrease. The effect of the increase on the inner ends and the decreased draft forces on the outer ends is to restore the disk gangs substantially to their level operating position, automatically swinging the inner ends upwardly and rearwardly and the outer ends of the gangs downwardly and forwardly until a stabilized position is secured.

A further feature of this invention is the provision of an articulated offset disk harrow having an angle control member extending between the laterally outer rear gang and the laterally inner front gang, whereby the angle control member does not interfere with or restrict the flexibility of the laterally outer gangs relative to the laterally inner gangs. A further feature of this construction is that when the gangs are swung into their parallel or transport position, in which the front and rear gangs are disposed alongside one another, the angle control member is swung to a position substantially overlying the gangs, the angle control member being disposed with its ends generally within the confines of the folded gangs. Thus, the harrow may now be easily transported in an endwise position, as by an implement carrier, through relatively narrow spaces, along relatively narrow lanes and the like.

These and other objects and advantages of the present invention will be apparent to those skilled in the art after a consideration of the following detailed description, taken in conjunction with the accompanying drawings, in which:

FIGS. 1 and 1a, taken together, form a perspective view of a disk harrow in which the principles of the present invention have been incorporated, the harrow being shown in its angled or operating position.

FIGS. 2 and 2a, taken together, form a view similar to FIGS. 1 and 1a, but illustrating the harrow in its straightened or transport position.

FIG. 5 is a sectional view taken along the line 5—5 of FIG. 1.

FIG. 6 is a top or plan view of the pivot parts shown in FIG. 5.

FIG. 7 is a sectional view taken generally along the line 7—7 of FIG. 1, showing certain details of the angle control latch.

FIG. 8 is a sectional view taken generally along the line 8—8 of FIG. 7.

FIG. 9 is an enlarged fragmentary detail plan of the hinge connection between the hitch cross bars of the front gangs.

FIG. 10 is a fragmentary view, somewhat similar to FIG. 3, showing the front gang bearing and frame connection.

Figure 1:
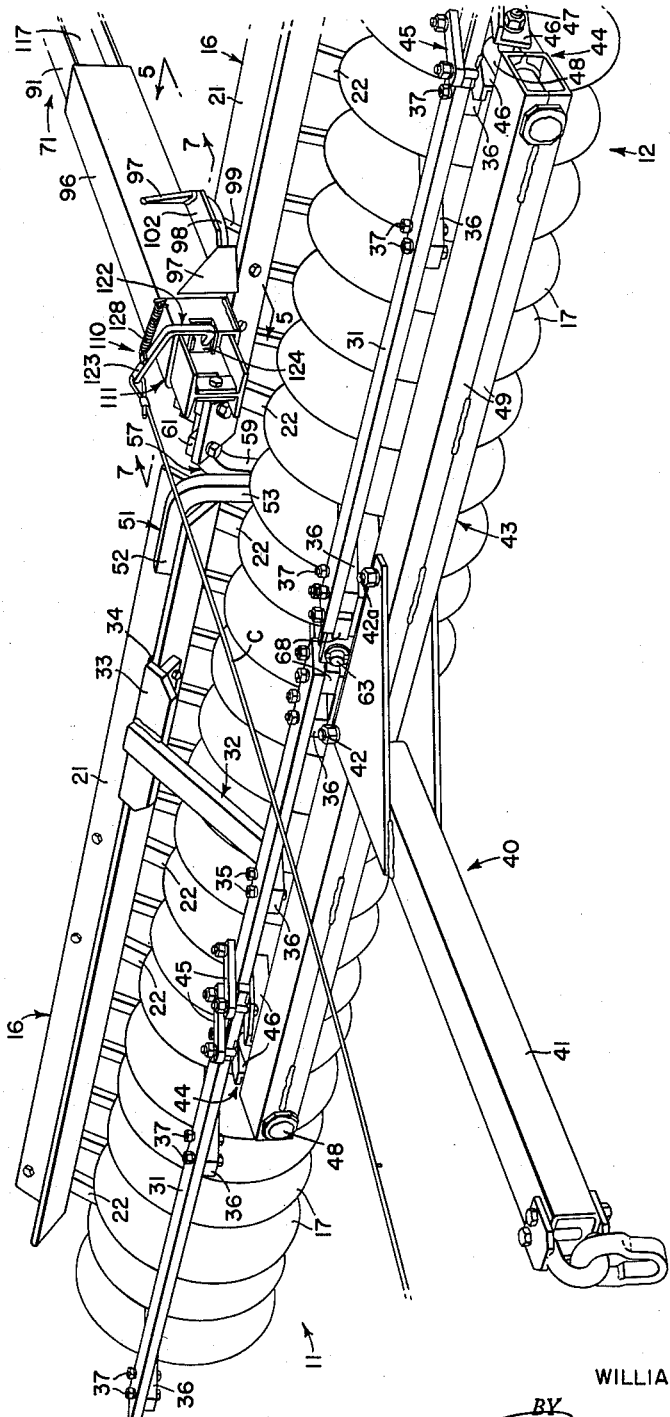

The implement in which the principles of the present invention have been incorporated, and illustrated in the accompanying drawings, is a flexible offset disk harrow of the deep tillage large capacity type. The disk harrow of this invention comprises a pair of front gangs 11 and 12, and a pair of rear gangs 13 and 14. The front gangs are normally disposed in axially alined or end-to-end relation, and the same is true of the rear gangs. Each gang includes a gang frame 16 and an associated gang of axially alined disks 17 mounted on the usual gang bolt 18 and supported for rotation with respect to the associated gang frame 16. Each gang frame 16 comprises a main member in the form of a heavy angle 21 disposed generally transversely and arranged with the flanges equally angled with respect to a vertical plane. Each gang of disks is equipped with conventional bearing means 20 (FIG. 10) that is connected to downwardly and forwardly extending bearing standards 22, there being one at each end of each gang frame and two intermediate standards. The upper end of each of the bearing standards is bolted, as at 23, or otherwise rigidly connected to the rear flange of the associated angle member 21. As so far described, the gang frame and associated gang disks making up the rear unit are substantially identical, for all practical purposes, with the corresponding parts of the front unit, which is shown specifically in FIG. 10, except that the rear units do not have the forwardly and upwardly extending portions 36.

The front gangs 11 and 12 are pivotally connected with the rear gangs 13 and 14 for movement relative to each other about a vertical axis. This connection is made by means of a front pivot bracket 26 clamped to the laterally inner end portion of the main angle member 21 of the laterally inner front gang frame 12. The bracket 26 includes a vertical shaft 27 that is journaled in the companion bracket 28 fixed to the laterally inner end of the laterally inner rear gang frame 21. The rear bracket 28 includes an attaching section 29 and a sleeve section 30 that receives the lower portion of the pivot shaft 27.

Implements of the type with which the present invention is particularly concerned are fairly wide, and may be constructed to work a strip of ground 20 or more feet in width. Hence, when operating over uneven terrain, it is quite desirable to permit the two front gangs to pivot with respect to one another about a generally horizontal axis, and the same is true of the rear gangs. To this end, the center or adjacent ends of the two angle members 21 of the front gangs carry new and improved hinge means establishing a generally horizontal axis about which one gang frame may swing generally vertical relative to the other. This hinge means provides the above mentioned self-equalizing action and will now be described.

Connected to each of the two front gang frames is a hitch cross bar 31, the connection being established by means that includes a downwardly and forwardly extending support or bracket 32 (FIGS. 1 and 1a). Each of these parts includes at its rear and upper end a transverse bracket 33 that is secured in any suitable way, as by bolts 34 or the like, to the associated portion of the angle member 21. Each bracket 32 is extended downwardly at an angle and at its forward end receives the hitch cross bar 31, being bolted to the latter as at 35. The ends and the intermediate portions of the cross bars 31 are connected to the associated bearing brackets or supports 22 by generally fore-and-aft extending bars 36 that are bolted at their forward ends, as at 37, to the end portions of the associated hitch cross bar 31 and at their rear ends the bars 36 are connected to the lower forward end of and, as shown in FIG. 10, actually form a part of the associated bearing support bars 22. Thus, each hitch cross bar 31 is secured to and forms a rigid part of the associated gang frame 16.

The propelling agency for the disk harrow, such as a conventional farm tractor, is connected with the harrow by means of a hitch tongue unit 40 that comprises a forwardly extending draft member 41 connected, as by pivot bolt means 42, to the generally central portion of a transverse draft bar 43. Each end of the transverse draft bar 43 is pivotally and loosely connected to the associated hitch cross bars 31 by means of pivot means 44. This means comprises a pair of clamps 45 fixed to the associated bar 31, each clamp including a lower angle member 46, the vertical flanges of which are apertured to receive a cross pin 47. Loosely connected to each cross pin is a fore-and-aft extending stud 48, the rear end of which is apertured to loosely receive the associated pin 47. The forward end of each of the studs 48 is secured, as by welding, to the associated end of the transverse bar 43, which preferably is made up of a pair of channels 49 welded together. It will be seen from FIGS. 1 and 1a that the pivot connections 44, between the draft bar 43 and the two associated gang frames 16, are disposed generally centrally of said frames. A bolt 42a cooperates with the bolt 42 in adjustably fixing the tongue 40 to the draft bar 43.

The adjacent ends of the two front gang frames, with the associated cross bars 31, are hingedly interconnected by means that provides a hinge axis extending at a relatively small angle to the horizontal so that, generally speaking, the inner ends of the disk gangs may rise and fall with corresponding lowering and raising movement of the opposite or outer ends of the two gangs. However, the aforesaid hinge axis lying at an angle to the horizontal, also provides a certain amount of rearward movement of the inner ends of the disk gangs when they swing upwardly and corresponding forward movement of the opposite ends of the gangs when they swing downwardly. Similarly, when the inner ends of the gangs swing downwardly, these ends also move forwardly, and correspondingly the outer ends of the gangs swing upwardly and rearwardly. Through this action the above-mentioned equalizing function is secured. The means providing this hinge axis for the front gangs 11 and 12 will now be described.

Figure 3:
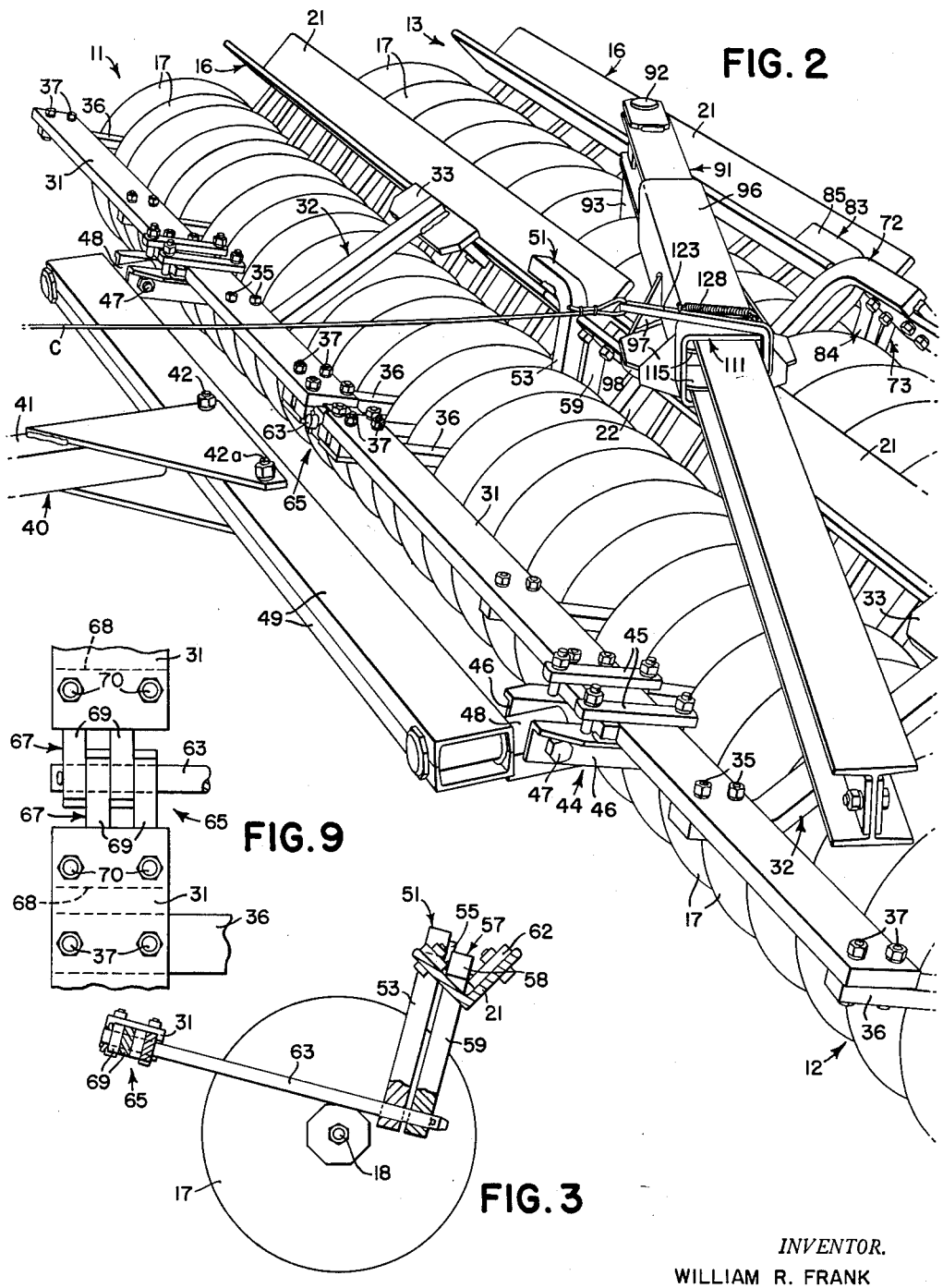
FIG. 3 is a fragmentary transverse sectional view showing the hinge connection between the front gangs.
Figure 4:
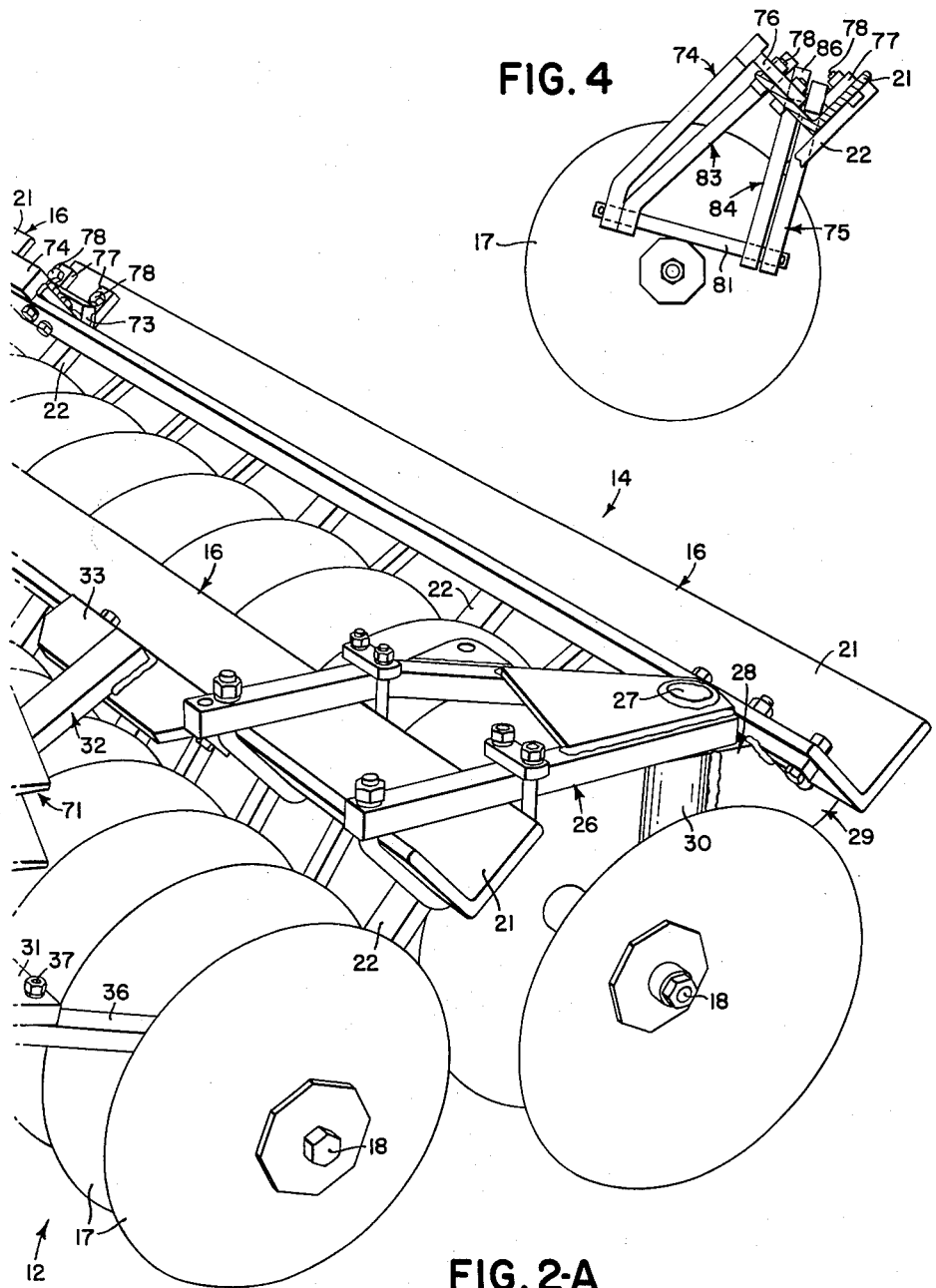
FIG. 4 is a sectional view, similar to FIG. 3, showing the hinge connection between the rear gangs.

A hinge bar 51 for the outer or right hand front gang includes a generally horizontal leg 52 and a generally downwardly extending leg 53. The horizontal leg 52 is secured, as by welding, to the laterally inner end of the outer frame angle 21 and the other leg 53 extends downwardly and forwardly to points below the level of the associated hitch bar 31, as best shown in FIG. 3, and laterally inwardly of the inner end of the frame angle 21 as best shown in FIG. 1. The connection between the horizontal hinge bar section 52 and the associated flange of the angle member 21 is reenforced by plates 55 welded to the rear sides of the hinge bar section 52 and the associated flange of the V-shaped member 21. A similar hinge bar 57 lies adjacent the laterally outer end of the inner angle member 21 and similarly comprises a horizontal bar section 58 (FIG. 3) and a generally downwardly extending section 59, the horizontal section 58 being welded to attaching parts 61 and 62 that are bolted or otherwise fixed to the outer end portion of the associated laterally inner gang frame angle member 21. The generally downwardly extending portion 59 of the hinge bar 57 extends alongside the downwardly extending portion 53 of the companion hinge bar 51, the lower ends of these two sections being apertured to receive a pivot pin or pintle 63 that preferably takes the form of a relatively long rod member, the forward ends of which are extended through hinge means interconnecting the adjacent ends of the associated hitch bars 31. The latter hinge means, indicated generally at 65, comprises a pair of hinge parts 67 (FIG. 9), each including an apertured bar 68 and a pair of apertured lugs 69, the apertures in the latter receiving the forward end of the associated pintle means or hinge pin 63. The apertures in the hinge bars 68 receive bolts 70 that fix the hinge parts 67 to the adjacent ends of the bars 31. The draft connections 44 are sufficiently loose to accommodate not only the pivoting of the inner and outer gangs relative to the axis of the hinge pintle 63, but also the relatively slight lateral displacement of the center portions of the gang frames relative to the associated end portions of the draft bar 43.

The rear gang frames are connected at their adjacent ends for hinging movement about an axis that is angled relative to the horizontal by means similar to that described, but such hinge means differs slightly in detail because the rear gangs 13 and 14 do not have any associated hitch cross bars 31, the draft pull being transmitted from the front gangs to the rear gangs through the pivot connection 27 and an angle control beam member 71 (FIGS. 1 and 1a) that will be described in detail below. The hinge means for the rear gangs include two pairs of hinge bars, each bar being generally L-shaped, like the bars 51 and 57 described above. The two hinge bars for the inner or left hand rear gang frame are indicated at 74 and 75, and are welded to attaching plates 76 and 77 that are apertured to receive connecting bolts 78. The lower ends of the two hinge bars 74 and 75 are apertured to receive a pivot pin or pintle 81.

The hinge bars associated with the right hand or outer gang frame are indicated by the reference numerals 83 and 84 and are similar to the hinge bars 74 and 75 in that they include generally horizontal sections 85 and 86 that are welded or otherwise rigidly secured in any suitable way to the inner end of the laterally outer end gang frame member 21. The lower ends of the bars 83 and 84 are spaced apart a distance such that they may be disposed in nested relation between the lower ends of the associated hinge bars 74 and 75, and they are apertured to receive the pin or pintle 81. The hinge axis established by the pin or pintle 81 and the associated hinge bars are disposed at about the same angle to the horizontal as the hinge axis defined by the front pin or pintle 63.

The angle control member 71 forms a draft transmitting and angle controlling connection between the right hand rear or laterally outer gang 13 (FIG. 1a) and the front laterally inner gang 12 (FIG. 1). The angle control member 71 comprises an H-beam 91 connected by a vertical pivot 92 to the rear gang 13, the lower end of the pin 92 being received in the sleeve portion 93 of a bracket member 94 bolted, as at 95, to the right hand rear angle member 21. The forward end of the H-beam 91 is disposed for sliding movement within the sleeve section 96 that is pivoted to the laterally outer end portion of the angle member 21 of the left hand or laterally inner forward gang 12.

This pivot connection between the sleeve 96 and the associated angle member 21 of the inner forward gang frame 16 is established by means of two pairs of angle slips 97 that are welded to opposite sides of the sleeve 96. The angle clips 97 embrace a circular plate 98 that is welded to a pair of attachment brackets 99 that is bolted, as at 101, to the associated gang frame angle 21. The clips 97 are welded to and reinforced by a base plate 102 that is fixed to the lower side of the sleeve 96. Thus, the sleeve 96 and beam 91 are connected with the inner forward gang frame for movement relative thereto about a generally vertical axis.

The H-beam member 91 extends forwardly through the sleeve 96 and is locked in different positions by latch means 110 that is best shown in FIGS. 1, 7 and 8. Preferably, the latch means 110 includes a slide 111 encircling the H-beam 91 in front of the sleeve 96, the slide 111 including a body closely fitting the beam 91 and made up of a channel section 113 closed by a plate section 114 suitably welded together. Two pairs of guide lugs 115 and 116 are fixed to the slide 111 as shown in FIG. 7 and arranged to engage the web 117 of the H-beam 91. The lugs 116 are notched, as at 119, to receive the pivot 121 of a swingable latch member 122 that is carried by the slide 111. The member 122 includes a handle section 123 and a forward detent section 124 in the form of a block welded to the pivot 121. The detent 124 is adapted to enter one of a plurality of associated slots 125 formed in the center web 117 of the H-beam 91. A latch return hook 126 is also fixed to the pivot member 121 of the swingable member 122 and this hook includes a section 127 that is adapted to be engaged with a lug 130 on the guide sleeve 96, for a purpose that will be explained below, when a pull is exerted on the associated control cable C to swing the handle section 123 forwardly against the action of a biasing spring 128. Normally, the spring 128 holds the latch 122 in a position such that the lug 124 engages in the associated slot 125 with the slide 111 up against the forward end of the sleeve 96. This serves to limit rearward movement of the beam 91 relative to the sleeve 96, as will be clear from FIG. 1.

When the latch handle section 123 is pulled forwardly only part way, both the lug 124 and the return hook 127 are held disengaged from the beam 91 and the sleeve 96 and the bar or beam 91 may move forwardly relative to both the sleeve 96 and the slide 111. If the harrow is closed with the cable C released, the slide 111 moves forwardly with the beam 91, and hence the harrow can be closed by auxiliary means (not shown), such as a cable control, tractor turn bar, or hydraulic cylinder without losing the predetermined position of the latch slide on the beam. If changing field conditions make it desirable or necessary to reposition the latch, it can be done conveniently from the operator's position on the tractor by holding the cable C while opening or closing the harrow, holding the cable with sufficient force to engage the return hook 127 with lug 130 on the angling guide sleeve 96 which also holds the detent 124 out of the angling beam slots. When the slot that produces the desired angle is reached the pull on the cable is released.

Figure 2:
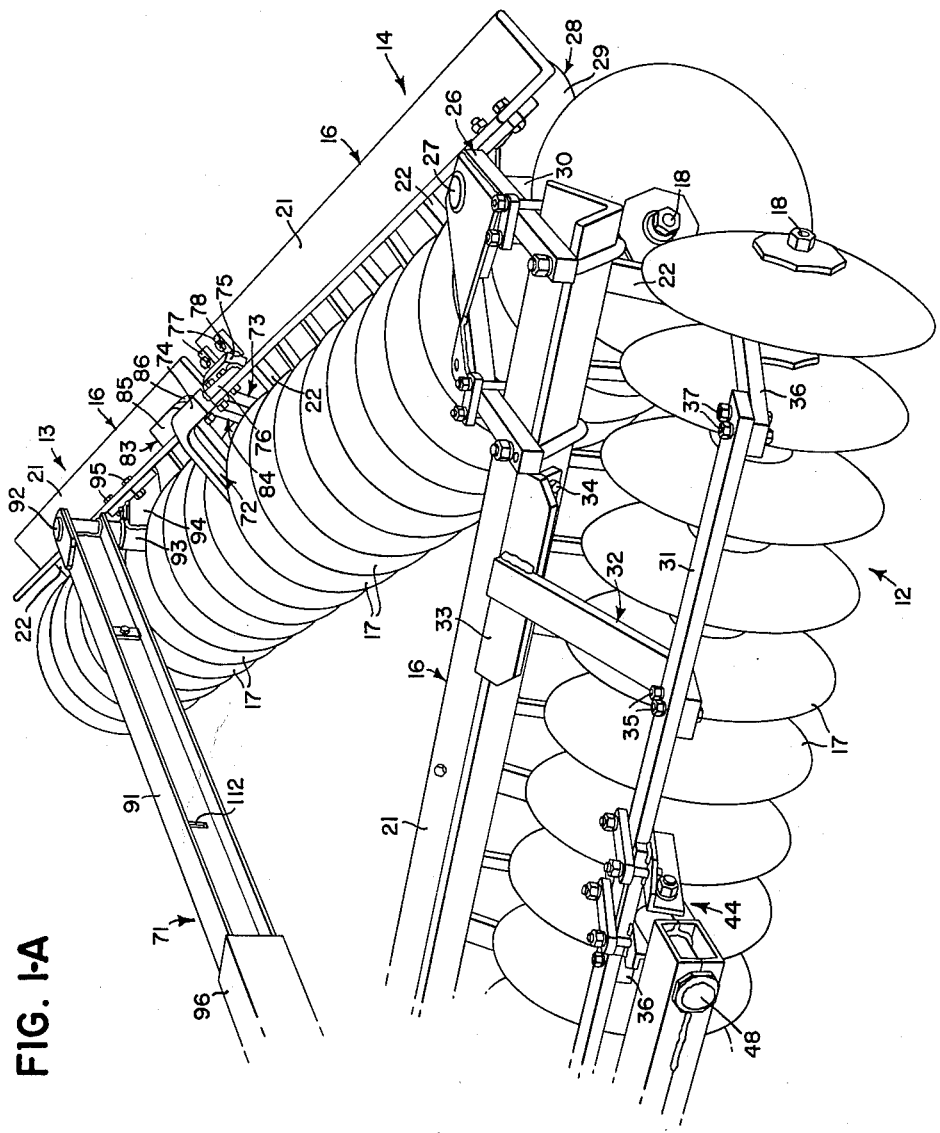

It will be noted from FIG. 2 that the pivot member 92 at the rear of the angling beam 71 is disposed approximately centrally of the draft frame for the rear laterally outer gang while the pivot means 97, 98 provided for the front end of the angling beam 71 is carried by the frame angle 21 for the laterally inner front gang, which disposes the latter pivot means in such position that when the gangs are folded for transport, in which position the disk gangs are generally parallel, as will be seen in FIG. 2, the H-beam 91 overlies the folded gangs and the ends of the beam lie generally between the front and rear portions of the harrow. As a result of this construction, the folded harrow is fairly narrow and can readily be handled by the usual transport trailer or implement carrier adapted for implements of this kind.

Looking at FIG. 1, it will be seen that the latch means 110, including the slide member 111, limits the angling of the front gangs relative to the rear gangs by locking the beam 91. If it should be desired to reduce the angle, the operator exerts a pull on the cable C sufficient not only to disengage the detent 124 from the beam 91 but also to engage the hook 127 (FIG. 8) with the lug 130. The outfit is then backed, which causes the rear gangs to swing forwardly relative to the front gangs and the beam to slide forwardly relative to the guide sleeve 96 and slide 111, the latter being held to the sleeve 96 by the hook 127. The pull on the cable C is released when the desired reduced angle is reached, whereupon the slide 111 becomes reconnected with beam 91. Then when the outfit is driven forwardly, the detent 124 holds the gangs at the new position. To arrange the gangs for transport, as shown in FIGS. 2 and 2a, from an operating position (FIGS. 1 and 1a), the cable C is pulled to release the detent 124 and engage the return hook 127. The outfit is then backed until the rear gangs are swung up against the forward gangs into the position shown in FIGS. 2 and 2a. Then the pull on the cable C is released and the spring 128 swings the detent 124 into engagement with the transport slot 112 (FIG. 1a), thus locking the slide 111 to the beam 91 with the latter in a forward and inner position (FIG. 2) and the slide 111 against the front end of the sleeve 96. This holds the gangs in straightened position with the beam 91 carried over the folded gangs and disposed within the front and rear confines of the gangs, as shown in FIG. 2.

Having described my invention, what I claim and desire to secure by Letters Patent is:

1. In a disk harrow, a pair of generally axially aligned disk gangs arranged in substantially end-to-end relation and each constructed and arranged to work substantially the same width of ground, each disk gang including a gange frame; hinge means interconnecting adjacent ends of said gang frames and including a pair of fore-and-aft spaced apertured members on each gang frame, the lower ends of the forward members being disposed above the lower ends of the rear members, said ends being apertured, and hinge pin means extending through the apertures in the associated members to provide a hinge axis that lies in a line extending in a forward and upward direction, and hitch means connected to the generally central portions of said gang frames and including means accommodating movement of said gang frames about said hinge axis.

2. An offset disk harrow comprising a pair of front gangs and a pair of rear gangs, each gang having a set of axially aligned disks and a gang frame in which said disks are rotatable about a disk axis, a first hinge means connecting the front gang frames in end-to-end relation with the associated disk axes normally in alignment, a second hinge means connecting the rear gang frames in end-to-end relation with the associated disk axes normally in alignment, each of said hinge means establishing a hinge axis between the associated gang frames that extends generally upwardly and forwardly and is disposed closely adjacent the associated disk axes, hitch means connected with the generally central portion of each of the front gang frames, a frame pivot connecting one rear gang frame with the associated front gang frame, and draft-transmitting means extending from one of the front gang frames to the other of said rear gang frames, said frame pivot extending generally vertically whereby said front gangs and said rear gangs are swingable toward and away from one another about a generally vertical axis, said draft-transmitting means comprising a draft transmitting member connected between the outer rear gang frame and the inner front gang frame, means pivotally and shiftably connecting one end portion of said draft transmitting member with said inner front gang, and means pivotally connecting the opposite end portion of said draft transmitting member with the outer rear gang.

3. The invention set forth in claim 2, further characterized by said pivotal and shiftable connecting means and said pivotal connecting means being located so that when the front and rear gangs are swung about said vertical pivot axis into a position alongside one another said draft transmitting member overlies said gangs and is disposed within the marginal confines thereof.

4. In a disk harrow, an articulated frame construction, comprising a pair of gang frames arranged in end-to-end relation, each of said frames including a generally transverse upper frame member, downwardly and forwardly extending bearing support bars fixed at their rear end portions to said frame member, a gang of disks, bearing means on the intermediate portions of said support bars, a hitch cross bar fixed to the forward portions of said bearing support bars of each gang frame, hinge brackets on the adjacent end of said hitch cross bars, generally vertical hinge bars fixed, respectively, to the adjacent ends of said gang frames and extending generally downwardly to points adjacent the axes of said disk bearing means, said hitch cross bars and the associated hinge brackets lying above the level of said axes, and gang frame hinge means pivotally interconnecting the lower portions of said hinge bars and the hinge brackets on the adjacent ends of said hitch cross bars.

5. An offset harrow of the flexible type, comprising a pair of normally axially aligned inner and outer front gangs, a pair of normally aligned inner and outer rear gangs, generally vertical pivot means interconnecting the inner ends of the inner front and rear gangs, whereby the front and rear pairs of gangs may swing, one relative to the other, into and out of angled and transport position, an angle control member pivotally connected at its rear end with the outer of the rear gangs and extending generally forwardly and inwardly toward the front inner gang, means on the latter slidably receiving said angle control member and pivotally mounted on the front inner gang at a point on the latter spaced laterally inwardly of the point of pivotal connection between the rear end of the control member with the outer of the rear gangs, the connections between said angle control member and said outer rear gang and said inner front gang being located in spaced apart relation laterally of the harrow so that when the gangs are in their transport position, said angle control member overlies said gangs and has its ends disposed generally between the front and rear portions of the harrow.

6. An offset harrow of the flexible type, comprising a pair of normally axially aligned inner and outer front gangs, a pair of normally aligned inner and outer rear gangs, generally vertical pivot means interconnecting the inner ends of the inner front and rear gangs, whereby the front and rear pairs of gangs may swing, one relative to the other, into and out of angled and transport position, front hinge means interconnecting the adjacent ends of the front gangs for generally vertical flexibility, rear hinge means interconnecting the adjacent ends of the rear gangs for generally vertical flexibility, and an angle control member pivotally connected at its rear end with the outer of the rear gangs and extending generally forwardly and inwardly toward and pivotally and slidably connected with the inner front gang, whereby in operation the outer front gang is free to swing generally vertically relative to the inner front gang independently of the angle control member.

7. In a disk harrow, an articulated frame construction, comprising a pair of gang frames arranged in end-to-end relation, each of said frames including a generally transverse upper frame member, downwardly and forwardly extending bearing support bars fixed at their rear end portions to said frame member, a gang of disks carried by the lower portions of said downwardly and forwardly extending support bars, a first set of generally vertical hinge bars fixed, respectively, to the adjacent ends of said gang frames and extending generally downwardly to points adjacent the axes of said disk bearing means, a second set of hinge bars fixed, respectively, to the adjacent ends of said gang frames and extending downwardly and forwardly to points in front of and above the lower ends of the hinge bars of said first set, and gang frame hinge means pivotally interconnecting the lower ends of said first and second sets of hinge bars.

8. In a disc harrow, an articulated frame construction comprising a pair of normally transversely aligned gang frames, each frame carrying a disc gang rotatable about an axis and each frame also including an upper member, and hinge means connecting adjacent ends of said members, said hinge means comprising hinge bars rigidly connected at their upper portions to said members and extending downwardly in divergent relation in a generally fore-and-aft extending vertical plane, the lower spaced apart ends of said hinge bars being apertured and spaced generally on opposite sides of the disc axis, and pintle means extending through the apertures of said bars, said apertures and said pintle forming the hinge pivot line which is inclined upwardly in the forward direction, said bars and said pintle means forming the sole means holding said frames against shifting horizontally out of alignment.

9. An agricultural implement comprising: a plurality of generally axially aligned ground working units arranged in substantially end-to-end relation, each of said units including a transversely disposed frame, front and rear spaced hinge means connected to the front and rear adjacent ends of the unit frames, said hinge means including coaxial hinge pin means extending through apertures in the front and rear hinge means, the rearward portion of the hinge pin means being disposed below the forward portion of the hinge pin means to provide a hinge axis that lies in a line extending in a forward and upward direction, whereby the outer ends of the implement are caused to move forwardly when they flex downwardly.

References Cited in the file of this patent

UNITED STATES PATENTS

| | | |
|---|---|---|
| 2,274,767 | Zink et al. | Mar. 3, 1942 |
| 2,377,521 | Rutter | June 5, 1945 |
| 2,518,646 | Straus | Aug. 15, 1950 |
| 2,604,746 | Frank et al. | July 29, 1952 |
| 2,632,987 | Jones | Mar. 31, 1953 |
| 2,685,159 | Brundage | Aug. 3, 1954 |
| 2,686,395 | Taylor | Aug. 17, 1954 |